United States Patent [19]

Kawano et al.

[11] Patent Number: 4,868,364
[45] Date of Patent: Sep. 19, 1989

[54] SEAM WELDER WITH FEEDBACK CONTROL TO COMPENSATE FOR VARYING WELDING SPEED

[75] Inventors: Hitoshi Kawano; Mitsuhiro Hayashi; Yukio Yamamoto; Kunikatsu Ban, all of Ise, Japan

[73] Assignees: Shinko Electric Co., Ltd., Tokyo; N.P.W. Technical Laboratory Co., Mie, both of Japan

[21] Appl. No.: 70,468

[22] Filed: Jul. 7, 1987

[30] Foreign Application Priority Data

Jul. 7, 1986 [JP] Japan ................................. 61-158968

[51] Int. Cl.⁴ .............................................. B23K 11/24
[52] U.S. Cl. ....................................... 219/110; 219/64
[58] Field of Search .......................... 219/110, 64, 108

[56] References Cited

U.S. PATENT DOCUMENTS 4,554,430 11/1985 Belamaric ........................... 219/110
4,677,272 6/1987 Tajiri .................................... 219/110

Primary Examiner—Clifford C. Shaw
Attorney, Agent, or Firm—Sughrue, Mion, Zinn, Macpeak & Seas

[57] ABSTRACT

A seam welder with wire electrodes inserted between upper and lower roller electrodes to weld an overlap section of a cylinderical body formed of metal plate between the electrodes. The power supply for the welder includes a rectifying circuit for obtaining a dc voltage from an ac current source, a smoothing circuit for smoothing the dc voltage, a single converting circuit to convert the smoothed dc voltage into an alternating polarity pulse voltage, a transformer for applying this pulse voltage to the upper and lower electrodes and a capacitor connected between the primary side of the transformer and the output side of the converting circuit with a capacitance that produces resonance with the inductance of the transformer primary at the pulse voltage frequency.

3 Claims, 6 Drawing Sheets

SEAM WELDER WITH FEEDBACK CONTROL TO COMPENSATE FOR VARYING WELDING SPEED

BACKGROUND OF THE INVENTION

1. Field of the invention

This invention relates to a seam welder and, more particularly, to a seam welder, in which upper and lower roller electrodes are disposed in a face-to-face relation, wire electrodes are inserted between said upper and lower roller electrodes, a metal plate or covered metal plate is guided continuously at a constant welding speed between said wire electrodes for effecting welding through heating by passing current, and a pulse voltage with the polarity thereof varying alternately is supplied between said upper and lower roller electrodes to energize said base material, thus varying the frequency of the pulse voltage according to variations of the welding speed to hold the welding current at a constant value.

2. Prior art

Heretofore, with a seam welding known as one of resistance welding techniques a welding section excellent in the liquid tightness can be obtained, so that it is used for the welding of liquid transportation pipes, fuel tanks, drum cans, food cans, etc. Among the seam welding the most general one is the lap seam welding. According to this lap seam welding, a base plate, such as a steel plate or like, is formed into a cylindrical body, and then the cylindrical body is moved between upper and lower roller electrodes opposed to each other, by which a pressure is applied to an overlap section of the cylindrical body, the overlap section being constituted by the edges of the base material lapped over. Between the upper and lower roller electrodes, an intermittent current flow through the overlap section, on which such pressure is applied, generates a joule heat and a subsequent partial fusion, so as to effect seam welding. In the seam welding method, a large amount of current can flow in a short period of time to increase the welding speed. Therefore, it is suited for mass production. Also, in the seam welding method, unlike spot welding, nuggets is continuously formed and partly, overlapped, so that a continuous seam welding section is formed. For this reason, in the seam welding, a welding joint can be obtained, which is excellent in the air tightness and water tightness. From this standpoint, this welding process is said to be suited for food cans and drink cans.

However, the drink cans and food cans are required to have corrosion resistance against the content. the cold-rolled steel plate is not directly used as the base material, but use is made of a covered steel plate, e.g., tin-plated steel plate. However, when the cylindrical body formed by such covered steel plate is subjected to seam welding by direct pressure application by the upper and lower roller electrodes, the covering metal, such tin or the like, existing on the surface of the covered steel plate, like transferred to the outer surface of the roller electrode, i.e., contact surface, forming contamination thereof. Unless such contaminant is removed off the contact surface of the roller electrodes, satisfactory welding can not be obtained.

From this standpoint, there has been proposed a seam welder as disclosed in Japanese Patent Publication 25213/1944. In this seam welder, as shown in FIG. 1, wire electrodes 3, i.e., copper wires, are provided on the outer periphery of the upper and lower roller electrodes 1 and 2, and an overlap section 4a of the cylindrical body, which is formed by the base material 4 is seam welded continuously between the wire electrodes 3. In this case, the upper and lower roller electrodes 1 and 2 are continuously rotated, and the outer periphery of the upper and lower roller electrodes 1 and 2 is provided with a guide groove. The wire electrodes 3 are inserted in these guide grooves and are fed together with the base material 4 with the rotation of the upper and lower roller electrodes 1 and 2. A large amount of current flows through the overlap section 4a between the wire electrodes 3 intermittently by the upper and lower rollers 1 and 2, so that the overlap section 4a is subjected to a partial fusion and seam welding thereof.

In this welder, a welding current Iw is fed intermittently between a pair of electrode rollers 1 and 2 at a predetermined frequency as shown by solid line in FIG. 2(a). Only at the time when the current flows through the overlap section, the overlap section is thermally fused, and nuggets 9, which are continuous to one another as shown in FIG. 2(b), are formed resulting in seam welding of the overlap section.

More specifically, in FIG. 1, a commercial three-phase AC power source drives a generator 5, from the output side of which a constant single-phase AC voltage is generated at a constant frequency. This single-phase-phase AC voltage is phase controlled by a rectifier 6 provided with a pair of thyristors 6a and 6b connected in opposite polarities so as to control the control voltage EC having a waveform as shown by dashed line in FIG. 2(a). The control voltage Ec is supplied to the primary side of the transformer 8 through a resonant capacitor 7. On the secondary side of the transformer 8 the voltage is increased, a welding current Iw flows between the pair roller electrodes 1 and 2 at a constant frequency as shown by solid line in FIG. 2(a). Correspondingly, nuggets 9 are formed in the overlap section of the cylindrical body formed by the base material 4, thereby obtaining a seam welding portion with the nuggets 9 in an aligned sequence, in which overlapping portion is formed between adjoining nuggets 9.

In this welder, however, the period or frequency of the single-phase AC voltage provided by the generator 5 is constant at all time, so that only a welding current Iw having a constant frequency can flow between the pair roller electrodes 1 and 2.

Therefore, if the welding is done at a welding speed in a range suited to the frequency of the welding current, the individual nuggets 9 partly overlap one another as shown in FIG. 2(b). When the welding speed gets out of the suitable range noted above, the nuggets no longer partly overlap, so that it is impossible to obtain a weld joint which is superior in the air tightness and water tightness. In other words, the proper welding speed is determined by the frequency of the single-phase AC voltage generated by the generator 5. In the prior art welder, however, a single-phase AC voltage with the frequency thereof varying continuously over a wide range can not be generated over a wide range. Therefore, an optimum welder is necessary according to the welding speed. This constitutes a large problem.

Further, in the case of FIG. 1 the output voltage of the generator 5 driven by a commercial three-phase AC supplied from a substation through a motor or the like is varied according to variations of the commercial three-phase AC current, and the welding condition is varied according to variations.

More particularly, the sudden fall of the commercial three-phase AC voltage is caused due to a phenomenon, such as the thunder, heavy rain, etc. With this rainfall the output voltage of the generator 5 falls, and the frequency of the generator 5 is varied with variations of the rotation of the motor or the like for driving the generator 5. For this reason, in seamwelding portion is generated regions where the welding current is insufficient, during welding process. As a result, by such insufficient current region, a partial formation of nugget with a reduced areais made during continuous formation of nuggets. Also, an existence of the area-reduced nugget makes a discontinuity between nuggets in sequence, because the area-reduced nugget can not be overlapped with adjoining nugget. Therefore, as to the resultant welding beads, mechanical strength is deteriorated.

DISCLOSURE OF THIS INVENTION

According to the invention, there is provided a seam welder, in which wires are inserted between upper and lower roller electrodes disposed in a face-to-face relation, a metal plate or a covered metal plate is guided between the wire electrodes, and the base material is welded through thermal fusion caused by causing current between the upper and lower roller electrodes while applying pressure. In this welder, a commercial three-phase AC power source is used as a welding power source, the output of this power source is full-wave rectified to obtain a DC voltage, this DC voltage is smoothed, and the smoothed DC voltage is converted into a pulse voltage with the polarity thereof changed alternately. This pulse voltage is applied between the upper and lower roller electrodes to effect seam welding of the base material.

Therefore, when converting the DC into a pulse voltage, the frequency of the pulse voltage can be readily adjusted. For this reason, the welding speed can be varied as desired in a wide range. The welding current obtained by this pulse voltage is continuous. Therefore, all of the nuggets are reliably overlapped, so that it is possible to obtain a welding section which is satisfactory and excellent in gas tightness.

According to the invention a compensation circuit is provided, whereby the pulse voltage or a current based thereon can be held at a constant value. Therefore, a constant welding section can be obtained at all time to improve the yield.

DESCRIPTION OF THE PREFERRED EMBODIMENT

Figure 3:
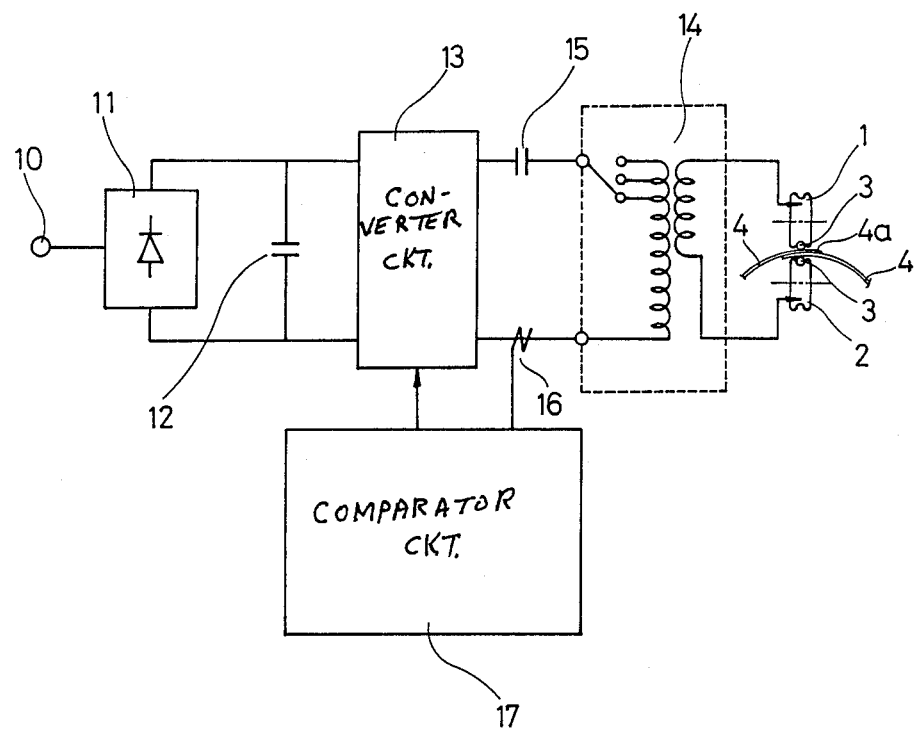
FIG. 3 is a block diagram showing an embodiment of the seam welder according to the invention.

First, referring to FIG. 3, reference numerals 1 and 2 designate upper and lower electrode rollers, numeral 3 a wire electrode, and numeral 4 a base material. As in the prior art example, the base material 4, there is formed a cylindrical body, i.e., an overlap section 4a, which, is sandwiched between the upper and lower roller electrodes 1 and 2 with the wire electrodes 3 passed on the outer periphery thereof. The overlap section 4a is welded by causing a large current through it while applying a pressure to it. However, in FIG. 3, the three-phase AC power source is applied to the current reception terminal 10. The three-phase AC power source supplied from the current reception terminal 10 is full-wave rectified by a rectifying circuit 11. The rectifying circuit 11 consists of a three-phase bridge rectifying circuit, and the full-wave rectified DC voltage is supplied to a smoothing circuit 12, which consists of a smoothing capacitor connected in parallel with the rectifying circuit 11, for reducing pulsations as much as possible so as to further approximate DC. A converting circuit 13 is connected between the opposite terminals of the smoothing circuit 12, and it converts the DC voltage into a pulse voltage with the polarity thereof varying alternately.

Figure 4A:
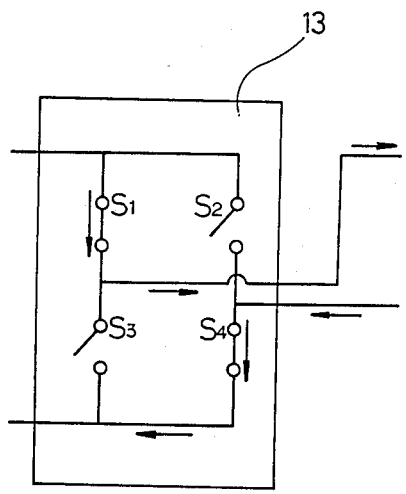
FIGS. 4(a) and (b) are views forexplaining the conduction state of each of the transistors in an example of the conversion circuit in the seam welder shown in FIG. 3.
Figure 4B:
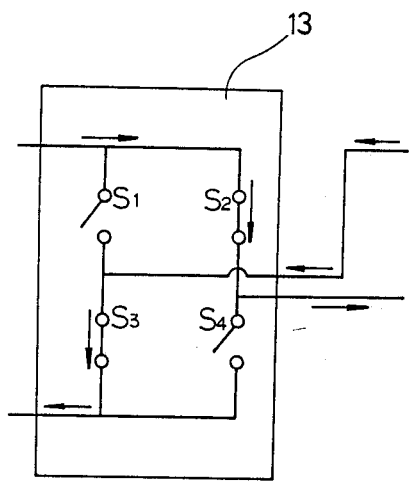

When the DC voltage is converted into a pulse voltage of varying polarity by the converting circuit 13, the pulse voltage may have a rectangular waveform. The converting circuit 13 uses four transistors $S_1$ to $S_4$ as switches as shown in FIGS. 4(a) and 4(b), these four transistors being connected in bridge.

Figure 2A:
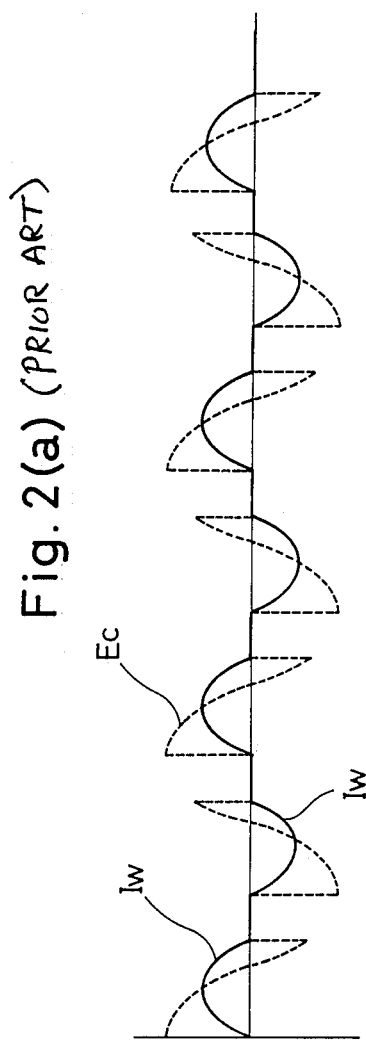
FIG. 2(a) is a graph showing the welding voltage and welding current applied by the seam welder shown in FIG. 1.
Figure 5A:
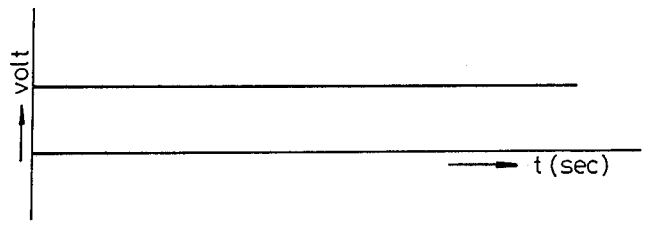
FIG. 5(a) is a graph showing an example of the current and voltage supplied to the conversion circuit in the seam welder shown in FIG. 3.
Figure 5B:
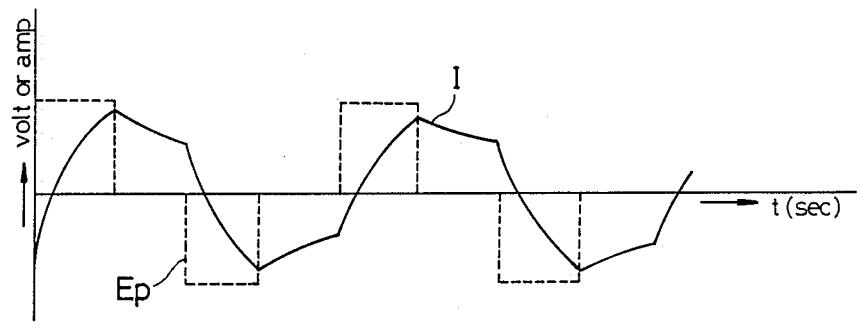
FIG. 5(b) is a graph showing the pulse voltage taken out from the output side of the conversion circuit by the seam welder shown in FIG. 3 and the welding current caused through the base material between the upper and lower roller electrodes by the pulse voltage.

More particularly, the voltage having been smoothed by the smoothing circuit 12 is a DC voltage as shown in FIG. 5(a), this voltage being a applied to the converting circuit 13. When the transistors $S_1$ and $S_4$ are turned on while the transistors $S_2$ and $S_3$ are turned off as shown in FIG. 4(a), current flows in the direction of the arrow. When the transistors $S_1$ and $S_4$ are turned off while the transistors $S_2$, $S_3$ and are turned of as shown in FIG. 4(b), current flows in the opposite direction. Therefore, through alternate switching of the transistors $S_2$ and $S_3$ and transistors $S_1$ and $S_4$ the DC voltage shown in FIG. 5(a) can be converted into a rectangular pulse voltage having voltage Ep, shown by dashed line in FIG. 5(b). When the pulse voltage Ep is applied, a welding current I flows between the upper and lower roller electrodes 1 and 2 as shown by solid line in FIG. 5(b). The welding current I, as shown in FIG. 5(b), is unlike the welding current Iw in the prior art shown in FIG. 2(a). Besides, by controlling the timing of switching of the transistors $S_1$, $S_2$, $S_3$ and $S_4$, the value of the welding current I and also the frequency of the pulse voltage Ep can be readily adjusted to permit ready adjustment of the welding current I.

For example, by property adjusting the cycle of the rectangular pulse voltage, the welding current I is continuous as shown FIG. 5(b). Therefore, the nuggets which are formed partly overlap and become continuous, so that it is possible to obtain a which is excellent in air tightness and has high mechanical strength.

A transformer 14 is connected to the output side of the converting circuit 13, and the pulse voltage is applied between the upper and lower roller electrodes 1 and 2 for welding. When causing welding by moving the overlap section of the base material 4 at a high speed in the welder, it is necessary to increase the magnitude and frequency of the welding current (see FIG. 5(b)) flowing through the the overlap section of base material 4. In case of the output side of the converting circuit 13 is directly connected to a transformer 14, by increasing the frequency, the wiring inductance ($\omega$ L) acts as resistance. Unless the secondary voltage of the transformer 14 is increased considerably, it is impossible to cause sufficient welding current through the base material 4 between the upper and lower roller electrodes 1 and 2. At this time, by tapping the transformer 14 it is possible to increase the secondary side voltage of the transformer 14 so as to increase the welding current. When the secondary side volatge is increased, it is necessary to increase the current capacity of the converting circuit 13. Further, the transistors $S_1$ to $S_4$ functioning as switches in the converting circuit 13 should meet this demand, thus increasing the price.

With the fluctuations of the transistors $S_1$ to $S_4$ in the converting circuit 13, a DC component is applied to a certain extent to the primary side of the transformer 14. As a result, polarization is generated in the core of the transformer 14. The transformer 14 is saturated by this polarization. As a result, an overcurrent is caused to flow through the transistors $S_1$ to $S_4$ in the converting circuit 14, thus causing rupture of the transistors $S_1$ to $S_4$.

For this reason, according to the invention a capacitor 15 is inserted between the output side of the converting circuit 13 and the primary side of the transformer 14.

When the capacitor 15 inserted between the output side of the converting circuit 13 and primary side of the transformer 14, the load impedance (Z) of the converting circuit 13 is given as $$Z=\sqrt{R^2+\{\omega L-(1/\omega C)\}^2}$$

where R is the resistance between the converting circuit 13 and transformer 14, L is the inductance between the converting circuit 13 and transformer 14, C is the capacity of the capacitor 15.

Thus, by controlling the capacitance (C) of the capacitor 15 such as to compensate the load impedance (Z), i.e., hold the condition $1/\omega C \leqq \omega L$, a sufficient welding current is easily ready to be ensured.

When the capacitor 15 is inserted, the unnecessary DC component which is contained in the output of the converting circuit 13 is cut, so that there is no need of providing any particular control circuit for preventing the polarization of the transformer 14.

A compensating circuit 17 is provided in order to hold the output of the converting circuit 13 at a constant value. When the output of the converting circuit 13 is varied with variations of the commercial three-phase AC power source, the compensating circuit 17 serves to hold this output, e.g., current or voltage, to a constant value.

More particularly, in FIG. 3 an output detector 16 is provided on the output side of the converting circuit 13, and the input side of the compensating circuit 17 is connected to the output detector 16 while the output side is connected to the converting circuit 13. The compensating circuit 17 compares the output detected by the output detector 16 as current to a predetermined reference current. An electric signal corresponding to the increase is fed back to the converting circuit 13, and according to this electric signal the conduction time of the transistors S to $S_1$, $S_2$, $S_3$ and $S_4$ the converting circuit 13 is controlled. More specifically, the compensating circuit 17 consists of a current converting circuit 171, a reference current setter 172, a difference amplifier 173, a reference wave generator 174, a comparator 175 and a base driver 176. The current converting circuit 171 rectifies and smooths the output detected by the output detector 16 to obtain a DC voltage, which is provided as an electric signal Sd representing a current value. A reference current Sc corresponding to a welding speed is set in advance in a reference current setter 172, and an output signal Sd of the current converting circuit 171 is subtracted from the value Sc in the difference amplifier 173. The difference output is amplifier and provided to the comparator 175. A reference wave generator 174 is connected to the comparator 175. The generator 174 generates a reference wave, e.g., a triangular wave, at a constant frequency. The comparator 174 compares the difference with a signal at the same frequency as the reference wave. The transistors S to S of the converting circuit 13 are on-off controlled by the base driver 176 according to the output of the comparator 174. The welding current is held at the value of the predetermined reference current Sc.

In other words, when the compensating circuit 17 is constructed in the above way, the frequency of the output of the converting circuit 13 is controlled to be equal to the reference frequency of the output wave of the reference wave generator 174. The output of the converting circuit 13 is held at a value corresponding to a set value Sc of the reference current setter 172. When a difference is generated between the set value Sc and output signal Sd of the current converting circuit 171 (for instance when a difference is produced with respect to the reference value of the welding current due to variations of the commercial AC power Source), the output of the difference amplifier 173 is varied according to the difference, and the pulse width of the output signal of the comparator 175 is varied according to these variations. In accordance with this variations the difference between the set value Sc and current signal Sd corrected.

Figure 6:
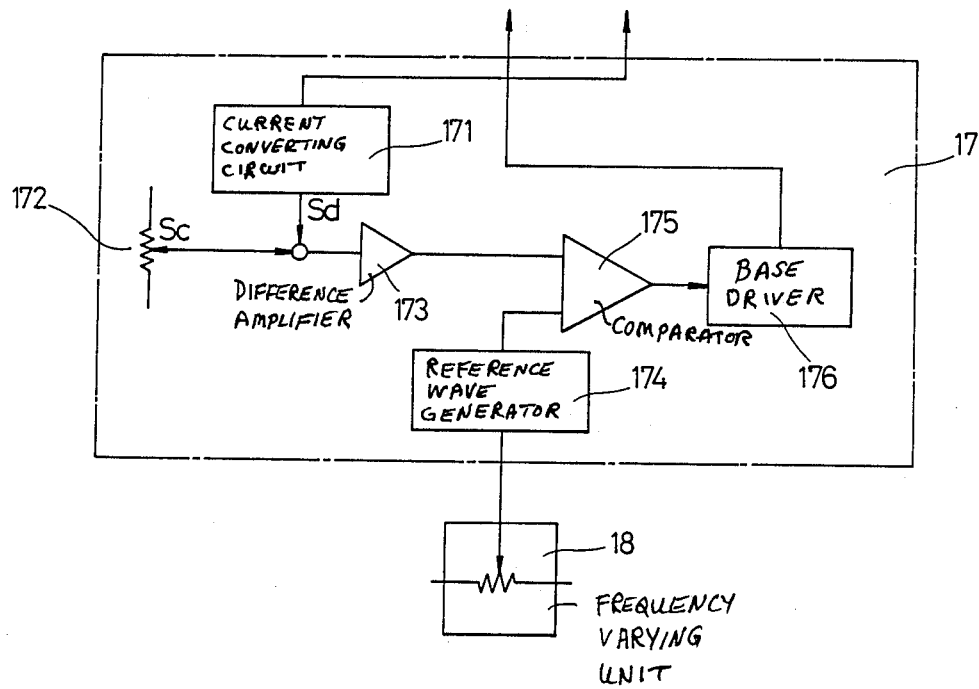
FIG. 6 is a block diagram showing an example of the compensation circuit of the seam welder shown in FIG. 3.

In the compensating circuit 17 having the above construction, a frequency varying unit 18 is connected to the reference wave generator 174. The frequency varying unit 18 consists of a variable resistor as shown in FIG. 6, and the frequency of the reference wave, e.g., a triangular wave, is controlled as desired by the variable resistor. Thus, the frequency of the output of the converting circuit 13 is controlled to the frequency adjusted by the frequency varying unit 18. The frequency this can be varied according to the welding speed so that the ratio of the welding speed to the frequency can be held in a constant range.

What is claimed is:

1. A seam welder, in which wire electrodes are inserted between upper and lower roller electrodes disposed in a face-to-face relation to each other, an overlap section of cylindrical body, which is formed by a metal plate or a covered metal plate, is guided between the two wires, and said overlap section is welded by heating and fusing it by passing current through it while pressing it between said upper and lower roller electrodes, comprising:
- a rectifying circuit for obtaining a DC voltage through full-wave rectification of a three-phase AC current source;
- a smoothing circuit for smoothing said DC voltage so as to reduce pulsations included in said DC voltage;
- a single converting circuit for converting said smoothed voltage into a pulse voltage with the polarity thereof varied alternately;
- a transformer for applying the pulse voltage between said upper and lower roller electrodes; and
- a capacitor, connected between the primary side of said transformer and the output side of said converting circuit, and having a capacitance necessary to produce electrical resonance with the inductance of said primary side of said transformer at the frequency of said pulse voltage.

2. A seam welder as set forth in claim 1, comprising a compensating circuit, in which the output current detected on the output side of said converting circuit is compared to a reference value representing a required welding current at a desired welding speed, and which feeds back to said converting circuit a compensating signal, corresponding to a difference between said output current and said reference value, to hold said output current at said reference value.

3. A seam welder according to claim 1, wherein a frequency varying device is provided for varying the frequency of the pulse voltage, provided from said converting circuit, in accordance with variations in welding speed.

* * * * *

REEXAMINATION CERTIFICATE (1845th)
United States Patent
[11] B1 4,868,364

Kawano et al.

[45] Certificate Issued Nov. 10, 1992

[54] SEAM WELDER WITH FEEDBACK CONTROL TO COMPENSATE FOR VARYING WELDING SPEED

[75] Inventors: Hitoshi Kawano; Mitsuhiro Hayashi; Yukio Yamamoto; Kunikatsu Ban, all of Ise, Japan

[73] Assignees: Shinko Electric Co., Ltd., Tokyo; N.P.W., Technical Laboratory Co., Mie, both of Japan

Reexamination Request:
No. 90/002,466, Oct. 7, 1991

Reexamination Certificate for:
Patent No.: 4,868,364
Issued: Sep. 19, 1989
Appl. No.: 70,468
Filed: Jul. 7, 1987

[30] Foreign Application Priority Data

Jul. 7, 1986 [JP] Japan .................................. 61-158968

[51] Int. Cl.⁵ .................................. B23K 11/24
[52] U.S. Cl. .................................. 219/110; 219/64
[58] Field of Search .................... 219/110, 64, 108

[56] References Cited
U.S. PATENT DOCUMENTS 3,553,567 1/1971 Pesce et al. .
3,636,298 1/1972 Risberg et al. .
4,554,430 11/1985 Belamaric .

FOREIGN PATENT DOCUMENTS 1214517 11/1986 Canada .
0095194 7/1984 European Pat. Off. .

OTHER PUBLICATIONS

Electrical Principles of Electronics by Gillie, 1961 pp. 343-360.

*Primary Examiner*—Clifford C. Shaw

[57] ABSTRACT

A seam welder with wire electrodes inserted between upper and lower roller electrodes to weld an overlap section of a cylinderical body formed of metal plate between the electrodes. The power supply for the welder includes a rectifying circuit for obtaining a dc voltage from an ac current source, a smoothing circuit for smoothing the dc voltage, a single converting circuit to convert the smoothed dc voltage into an alternating polarity pulse voltage, a transformer for applying this pulse voltage to the upper and lower electrodes and a capacitor connected between the primary side of the transformer and the output side of the converting circuit with a capacitance that produces resonance with the inductance of the transformer primary at the pulse voltage frequency.

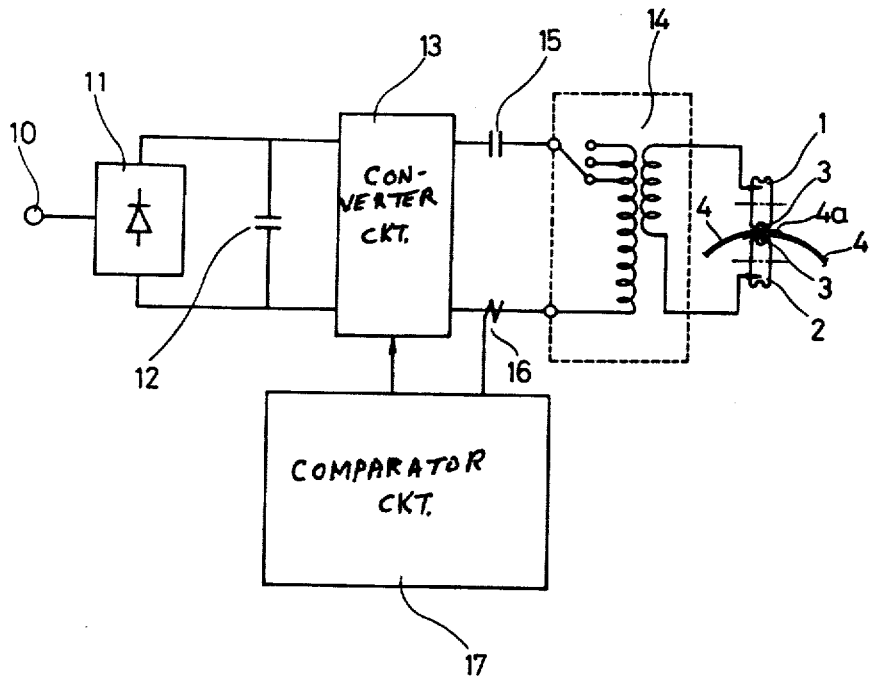

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 22–48:

Heretofore, with a seam welding known as one of resistance welding techniques a welding section excellent in the liquid tightness can be obtained, so that it is used for the welding of liquid transportation pipes, fuel tanks, drum cans, food cans, etc. Among the seam welding *processes* the most general one is the lap seam welding. According to this lap seam welding *process*, a base plate, such as a steel plate or like, is formed into a cylindrical body, and then the cylindrical body is moved between upper and lower roller electrodes *which are* opposed to each other[,] *and* by which a pressure is applied to an overlap section of the cylindrical body, the overlap section being constituted by the *overlapping* edges of the base material [lapped over]. Between the upper and lower roller electrodes, an intermittent current flow through the overlap section, on which such pressure is applied, generates a joule heat and a subsequent partial fusion, so as to effect seam welding. In [the] *this* seam welding method, a large amount of current can flow in a short period of time to increase the welding speed. Therefore, it is suited for mass production. Also, in [the] *this* seam welding method, unlike spot welding, nuggets [is] *are* continuously formed and partly[,] overlapped, so that a continuous seam welding section is formed. For this reason, in [the] *this* seam welding *process*, a welding joint can be obtained, which is excellent in [the] air tightness and water tightness. From this standpoint, this welding process is said to be suited for food cans and drink cans.

Column 1, lines 49–62:

However, the drink cans and food cans are required to have corrosion resistance against the content. [the] *The* cold-rolled steel plate is not directly used as the base material, but use is made of a covered steel plate, e.g., tin-plated steel plate. However, when the cylindrical body formed by such *a* covered steel plate is subjected to seam welding by direct pressure application by the upper and lower roller electrodes, the covering metal, such *as* tin or the like, existing on the surface of the covered steel plate, [like] *is* transferred to the outer surface of the roller electrode, i.e., contact surface, forming contamination thereof. Unless such contaminant is removed [off] *from* the contact surface of the roller electrodes, satisfactory welding can not be obtained.

Figure 1:
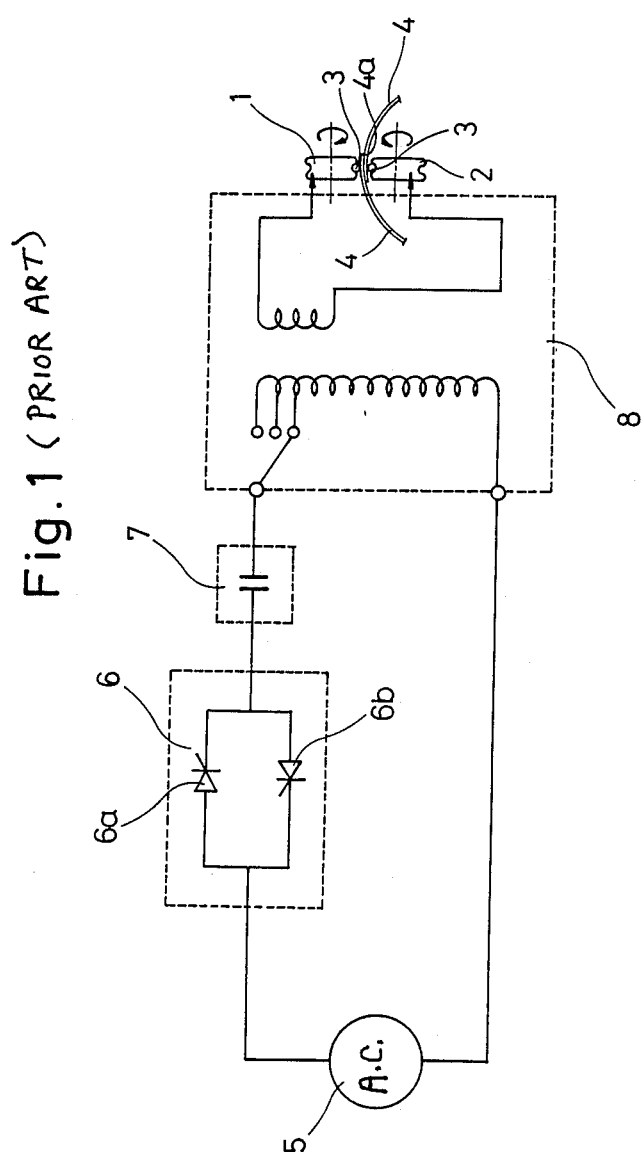
FIG. 1 is a block diagram showing a prior art seam welder.

Column 1, line 63 to column 2, line 13:

From this standpoint, there has been proposed a seam welder as disclosed in Japanese Patent Publication 25213/1944. In this seam welder, as shown in FIG. 1, wire electrode 3, i.e., copper wires, are provided on the outer [periphery] *peripheries* of the upper and lower roller electrodes 1 and 2, and an overlap section 4a of the cylindrical body, which is formed by the base material 4, is seam welded continuously between the wire electrodes 3. In this case, the upper and lower roller electrodes 1 and 2 are continuously rotated, and the outer periphery of *each of* the upper lower roller electrodes 1 and 2 is provided with a guide groove. The wire electrodes 3 are inserted in these guide grooves and are fed together with the base material 4 with the rotation of the upper and lower roller electrodes 1 and 2. A large amount of current *intermittently* flows through the overlap section 4a between the wire electrodes 3 [intermittently by] *in* the upper and lower rollers 1 and 2, so that the overlap section 4a is subjected to a partial fusion and seam welding thereof.

Column 2, lines 22–40:

More specifically, in FIG. 1, a commercial three-phase AC power source drives a generator 5, from the output side of which a constant single-phase AC voltage is generated at a constant frequency. This single-phase-phase AC voltage is phase controlled by a rectifier 6 provided with a pair of thyristors 6a and 6b connected in opposite polarities so as to control the control voltage [EC] *Ec* having a waveform as shown by dashed line in FIG. 2(a). The control voltage Ec is supplied to the primary side of the transformer 8 through a resonant compacitor 7. One the secondary side of the transformer 8 the voltage is increased, *and* a welding current Iw (*having a sinusoidal waveform with rounded peak portion*) flows between the pair *of* roller electrodes 1 and 2 at a constant frequency as shown by solid line in FIG. 2(a). Correspondingly, nuggets 9 are formed in the overlap section of the cylindrical body formed by the base material 4, thereby obtaining a seam welding portion with the nuggets 9 in an aligned sequence, in which *an* overlapping portion is formed between adjoining nuggets 9.

Column 2 lines 41–45:

In this welder, however, the period or frequency of the single-phase AC voltage provided by the generator 5 is constant at all [time] *times*, so that only a welding current Iw having a constant frequency can flow between the pair of roller electrodes 1 and 2.

Figure 2B:
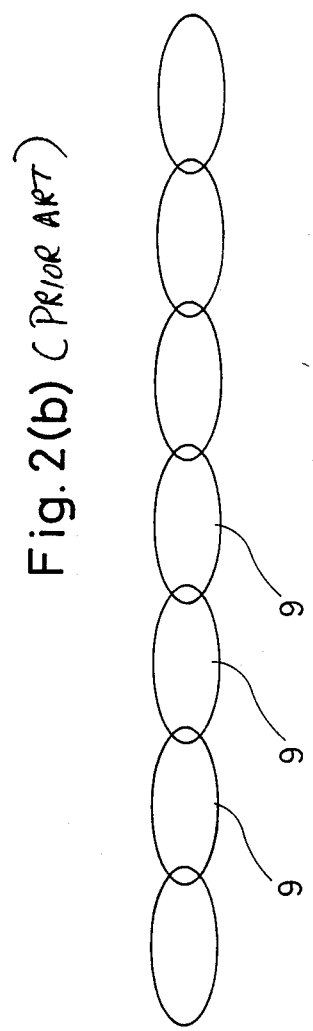
FIG. 2(b) is a view for explaining an example of nuggets formed by fusion with the welding current shown in FIG. 2(a)

Column 2, lines 46–60:

Therefore, if the welding is done at a welding speed in a range suited to the frequency of the welding current, the individual nuggets 9 partly overlap one another as shown in FIG. 2(b). When the welding speed gets out of the suitable range noted above, the nuggets no longer partly overlap, so that it is impossible to obtain a weld joint which is superior in [the] air tightness and water tightness. In other words, the proper welding speed is determined by the frequency of the single-phase AC voltage generated by the generator 5. In the prior art welder, however, a single-phase AC voltage with the frequency thereof varying continuously over a wide range can not be generated over a wide range. Therefore, an optimum welder is necessary according to the welding speed. This constitutes a large problem.

Column 3, lines 1–17:

More particularly, [the] *a* sudden fall [of] *in* the commercial three-phase AC voltage [is] *may be* caused [due to a phenomenon,] *by phenomena* such as [the] thunder, heavy rain, etc. [With this rainfall], *whereby* the output voltage of the generator 5 falls, and the frequency of the generator 5 is varied with variations of the rotation of the motor or the like for driving the generator 5. For this reason, [in seamwelding portion is] *there are* generated *in the welded seam some regions where the welding current is insufficient, during the welding process.* As a result, [by] *because of* such an insufficient current region, a partial formation of *a* nugget with a reduced [areais] *area is* made during *the* continuous formation of nuggets. Also, [an] *the* existence of the area-reduced nugget makes a discontinuity between nuggets in sequence, because the area-reduced nugget can not be overlapped with *an* adjoining nugget. Therefore, as to the resultant welding beads, mechanical strength is deteriorated.

Column 3, line 19:

[DISCLOSURE] *SUMMARY* OF [THIS] *THE* INVENTION

Column 3, lines 45-49:

According to the invention a compensation circuit is provided, whereby the pulse voltage or a current based thereon can be held at a constant value. Therefore, a constant welding section can be obtained at all [time] *times* to improve the yield.

Column 4, lines 12-35:

First, referring to FIG. 3, reference numerals 1 and 2 designate upper and lower electrode rollers, [numeral] *numerals* 3 *a pair of* wire [electrode] *electrodes*, and numeral 4 a base material. As in the prior art example, the base material 4[, there] is formed *as* a cylindrical body[, i.e.,] *having* an overlap section 4a[,] which [,] is sandwiched between the upper and lower roller electrodes 1 and 2 with the wire electrodes 3 [passed] on the outer [periphery] *peripheries* thereof. The overlap section 4a is welded by causing a large current *to flow* through it while applying a pressure to it. However, in FIG. 3, the three-phase AC power source is applied to the current reception terminal 10. The three-phase AC power source supplied from the current reception terminal 10 is full-wave rectified by a rectifying circuit 11. The rectifying circuit 11 consists of a three-phase bridge rectifying circuit, and the full-wave rectified DC voltage is supplied to a smoothing circuit 12, which consists of a smoothing capacitor connected in parallel with the rectifying circuit 11, for reducing pulsations as much as possible so as to further approximate DC. A converting circuit 13 is connected between the opposite terminals of the smoothing circuit 12, and it converts the DC voltage into a pulse voltage with the polarity thereof varying alternately.

Column 4, lines 42-64:

More particularly, the voltage having been smoothed by the smoothing circuit 12 is a DC voltage as shown in FIG. 5(a), this voltage being [a] applied to the converting circuit 13. When the transistors $S_1$ and $S_4$ are turned on while the transistors $S_2$ and $S_3$ are turned off as shown in FIG. 4(a), current flows in the direction of the arrow. When the transistors $S_1$ and $S_4$ are turned off while the transistors $S_2$, $S_3$ and are turned [of] *on* as shown in FIG. 4(b), current flows in the opposite direction. Therefore, through alternate switching of the transistors $S_2$ and $S_3$ and transistors $S_1$ and $S_4$ the DC voltage shown in FIG. 5(a) can be converted into a rectangular pulse voltage having voltage Ep, shown by dashed line in FIG. 5(b). When the pulse voltage Ep is applied, a welding current I flows between the upper and lower roller electrodes 1 and 2 as shown by solid line in FIG. 5(b). The welding current I, as shown in FIG. 5(b), is unlike the welding current Iw in the prior art shown in FIG. 2(a), *and is a continuous alternating current having a waveform with pointed peak portions (as opposed to the sinusoidal waveform having the rounded peak portions of current Iw).* Besides, by controlling the timing of switching of the transitors $S_1$, $S_2$, $S_3$ and $S_4$ the value of the welding current I and also the frequency of the pulse voltage Ep can be readily adjusted to permit ready adjustment of the welding current I.

Column 4, line 65 to column 5, line 2:

For example, by [property] *properly* adjusting the cycle of the rectangular pulse voltage, the welding current I is continuous as shown FIG. 5(b). Therefore, the nuggets which are formed partly overlap and become continuous, so that it is possible to obtain a *welding bead* which is excellent in air tightness and has high mechanical strength.

Column 5, lines 3-25:

A transformer 14 is connected to the output side of the converting circuit 13, and the pulse voltage is applied between the upper and lower roller electrodes 1 and 2 for welding. When causing welding by moving the overlap section of the base material 4 at a high speed in the welder, it is necessary to increase the magnitude and frequency of the welding current (see FIG. 5(b)) flowing through the overlap section of base material 4. In case [of] the output side of the converting circuit 13 is directly connected to a transformer 14, by increasing the frequency, the wiring inductance ($\omega$ L) acts as resistance. Unless the secondary voltage of the transformer 14 is increased considerably, it is impossible to cause sufficient welding current *to flow* through the base material 4 between the upper and lower roller electrodes 1 and 2. At this time, by tapping the transformer 14 it is possible to increase the secondary side voltage of the transformer 14 so as to increase the welding current. When the secondary side [volatge] *voltage* is increased, it is necessary to increase the current capacity of the converting circuit 13. Further, the transistors $S_1$ to $S_4$ functioning as switches in the converting circuit 13 should meet this demand, thus increasing the price.

Column 5, line 66 to column 6, line 30:

More particularly, in FIG. 3 an output detector 16 is provided on the output side of the converting circuit 13, and the input side of the compensating circuit 17 is connected to the output detector 16 while the output side is connected to the converting circuit 13. The compensating circuit 17 compares the output detected by the output detector 16 as current to a predetermined reference current. An electric signal corresponding to the increase is fed back to the converting circuit 13, and according to this electric signal the conduction time of the transistors [S to] $S_1$, $S_2$, $S_3$ and $S_4$ *of* the converting circuit 13 is controlled. More specifically, the compensating circuit 17 consists of a current converting circuit 171, a reference current setter 172, a difference amplifier 173, a reference wave generator 174, a comparator 175 and a base driver 176. The current converting circuit 171 rectifies and smoothes the output detected by the output detector 16 to obtain a DC voltage, which is provided as an electrical signal Sd representing a current value. A reference current Sc corresponding to a welding speed is set in [a] *the* reference current setter 172, and [an] *the* output signal Sd of the current converting circuit 171 is subtracted from the value Sc of the difference amplifier 173. The difference output is [amplifier] *amplified* and provided to the comparator 175. [A] *The* reference wave generator 174 is connected to the comparator 175. The generator 174 generates a reference wave, e.g., a triangular wave, at a constant frequency. The comparator [174] *175* compares the difference with a signal at the same frequency as the reference wave. The transistors [S] $S_1$ to [S] $S_4$ of the converting ciruit 13 are on-off controlled by the base driver 176 according to the output of the comparator [174] *175*. The welding current is held at the value of the predetermined reference current Sc.

Column 6, lines 31–48:
In other words, when the compensating circuit 17 is constructed in the above way, the frequency of the output of the converting circuit 13 is controlled to be equal to the reference frequency of the output wave of the reference wave generator 174. The output of the converting circuit 13 is held at a value corresponding to a set value Sc of the reference current setter 172. When a difference is generated between the set value Sc and output signal Sd of the current converting circuit 171 (for instance when a difference is produced with respect to the reference value of the welding current due to variations of the commercial AC power [Source] *source*), the output of the difference amplifier 173 is varied according to the difference, and the pulse width of the output signal of the comparator 175 is varied according to these variations. In accordance with [this] *these* variations the difference between the set value Sc and current signal Sd is corrected.

Column 6, lines 49–60:
In the compensating circuit 17 having the above construction, a frequency varying unit 18 is connected to the reference wave generator 174. The frequency varying unit 18 consists of a variable resistor as shown in FIG. 6, and the frequency of the reference wave, e.g., a triangular wave, is controlled as desired by the variable resistor. Thus, the frequency of the output of the converting circuit 13 is controlled to the frequency adjusted by the frequency varying unit 18. The frequency [this] *thus* can be varied according to the welding speed so that the ratio of the welding speed to the frequency can be held in a constant range.

AS A RESULT OF REEXAMINATION, IT HAS BEEN DETERMINED THAT:

Claim 1 is determined to be patentable as amended.

Claims 2 and 3, dependent on an amended claim, are determined to be patentable.

1. A seam welder[,] in which wire electrodes are inserted between upper and lower roller electrodes disposed in a face-to-face relation to each other, *in which* an overlap section of *a* cylindrical body, [which is] formed by a metal plate or a covered metal plate, is guided between the two [wires] *wire electrodes*, and *in which* said overlap section is welded by heating and partially fusing it by passing *a continuous periodically alternating* current *with pointed peak portions* through it, *each of said pointed peak portions making a partial fusion on said overlap section*, while pressing [it] *said overlap section* between said upper and lower roller electrodes, comprising:
   a rectifying circuit for obtaining a DC voltage through full-wave rectification of a three-phase AC current source;
   a smoothing circuit for smoothing said DC voltage so as to reduce pulsations included in said DC voltage;
   a single converting circuit for converting said smoothed voltage into a pulse voltage with the polarity thereof varied alternately, *said pulse voltage having a waveform necessary to generate said continuous periodically alternating current, with said pointed peak portions, between said upper and lower roller electrodes;*
   a transformer for applying the pulse voltage between said upper and lower roller electrodes; and
   a capacitor connected between the primary side of said transformer and the output side of said converting circuit, and having a capacitance necessary to produce electrical resonance with the inductance of said primary side of said transformer at the frequency of said pulse voltage.

\* \* \* \* \*